Patented Sept. 4, 1923.

1,466,665

UNITED STATES PATENT OFFICE.

KARL P. McELROY, OF WASHINGTON, DISTRICT OF COLUMBIA, ASSIGNOR, BY MESNE ASSIGNMENTS, TO CARBIDE AND CARBON CHEMICALS CORPORATION, A CORPORATION OF NEW YORK.

PROCESS OF MAKING GLYCERIN.

No Drawing.     Application filed August 6, 1917. Serial No. 184,601.

*To all whom it may concern:*

Be it known that I, KARL P. MCELROY, a citizen of the United States, residing at Washington, in the District of Columbia, have invented certain new and useful Improvements in Processes of Making Glycerin, of which the following is a specification.

This invention relates to processes of making glycerin; and it comprises a method of making synthetic glycerin from petroleum oils, or petroleum material, wherein such oils are gasified to make a heavy gas rich in propylene; this gas is then treated with chlorin or bromin in such a manner as to convert the propylene into halogenated compounds while not halogenating other constituents of the gas, the halogenated propylene derivatives are then further halogenated to replace a hydrogen atom by a halogen atom and the material thus produced is then saponified to produce glycerin; all as more fully hereinafter set forth and as claimed.

It is an old proposition to make glycerin ($CH_2OH.CHOH.CH_2OH$) from propane ($CH_3.CH_2.CH_3$) by first substituting Cl for three H atoms, giving symmetrical or 1-2-3 trichlorpropane ($CH_2Cl.CHCl.CH_2Cl$). Glycerin may be readily made from this particular trichlorpropane (there are several others which cannot be so converted) by replacing each Cl with an .OH group. The proposition, however, has not been commercially practicable for a number of reasons. One is that there is no source of pure propane much cheaper than glycerin itself. Another is that it is quite difficult so to chlorinate propane as to introduce three, and only three, atoms of chlorin, located each on a different carbon atom as is necessary in making symmetrical or 1-2-3 trichlorpropane.

In the present invention I use petroleum oils as the raw materials or starting point in the manufacture of synthetic glycerin. It is not very material what is the nature of the petroleum material employed except that it is better to use petroleum oils which are free from sulfur to avoid the necessity of purification. It is also desirable to use oils which are as free as may be of asphaltic constituents and cyclic (aromatic) bodies. Gas oil, kerosene, solar oil, crude petroleum, still bottoms, etc. etc. are all applicable to the present purposes. Any of these oils when passed through a heated retort or tube under proper conditions of temperature will give a gas which is rich in "unsaturated compounds"; these unsaturated compounds being mostly propylene and ethylene. If the temperature of a portion of the retort is around 700° C. or a red heat and proper care be exercised a gas can readily be made containing 50 per cent or thereabouts, of unsaturated compounds as shown by the bromin absorption test—that is, by measurement of the volume of gas absorbed by bromin water. The operation of gas making should always be followed analytically and if a gas be obtained with 50 per cent bromin absorption and an absorption by sulfuric acid not differing by more than 20 parts, or thereabouts, from the bromin absorption, it will be suitable for the present purposes. The difference between bromin absorption and sulfuric acid absorption may be taken roughly as representing ethylene.

Taking such a 50 per cent gas as typical it may be said roughly to contain about 20 to 22 per cent ethylene and 22 to 25 per cent propylene. The rest of the bromin absorption represents other unsaturated bodies such as acetylenes, diolefins, higher olefins, etc. For the present purposes this residual amount may be considered simply as impurity. In addition to the unsaturated compounds the gas also contains saturated gases, among them propane. This propane is not utilized directly in the present invention.

In the present invention advantage is taken of the fact that the propylene is more reactive than the ethyene. For the present purposes the ethylene is not advantageous. Propylene is $CH_3.CH:CH_2$, differing from propane ($CH_3.CH_2.CH_3$) by containing two less atoms of hydrogen. This difference is usually considered to mean that two of the carbons are united by a double bond or 2-point union; as indicated by the colon given in the formula. Unlike propane, propylene is a readily reactive gas and advantage is taken of this fact in the present invention.

The oil gas rich in propylene is then subjected to the action of a halogen, bromin or chlorin. Iodin may be used but is not as good as bromin or chlorin for the present purposes. Bromin is more reactive than chlorin in many of the hereinafter described reactions and though it costs more than chlorin this is not prohibitive since it may be recovered and reused indefinitely. But this reactivity makes it less convenient than chlorin in the first steps of the process since it reacts too readily with ethylene.

It is usually stated in the text books that ethylene and propylene combine readily with chlorin, taking up two atoms of chlorin. This is true as regards propylene but in the case of ethylene union is by no means so ready as is indicated in the books. In the absence of a catalyst it is difficult to secure union between ethylene and chlorin and even in the presence of a body having a catalyzing action on the reaction, such as water, union is slow. Advantage is taken of this fact in the present invention. Using bromin, which unites almost as readily with ethylene as with propylene, special precautions must be taken to ensure reaction with the propylene alone, or the brominated products must be separated.

Chlorin unites with propylene to give a body known as propylene dichlorid, $CH_3.CHCl.CHCl$. It will be noted that in this body one carbon carries no chlorin and the other two carbons each carry one atom of chlorin. Now, unlike many other chlorin-containing organic compounds, propylene dichlorid on chlorination tends to give a compound in which the added chlorin is joined to that carbon atom which is free of chlorin in the dichlorid. In other words, on substituting a Cl for an H in propylene dichlorid, the symmetrical or 1-2-3 trichlorpropane is made.

Propylene dichlorid, however, is not the only product of the action of chlorin on propylene. As I have discovered and elsewhere claimed, by admixing propylene with chlorin in the presence of steam, different bodies may be produced namely, propylene chlorhydrins. There are two of these chlorhydrins, $CH_2CHl.CH_2OH$ and $CH_3.CHOH.CH_2Cl$. Both are useful for the present purposes.

The impurities in the oil gas, unlike the ethylene but like the propylene, readily react with chlorin; the reaction being either to form bodies like propylene dichlorid or bodies like propylene chlorhydrins. For the present purposes the fact of the presence of these bodies in oil gas is immaterial since in so far as they form bodies like propylene dichlorid or the propylene chlorhydrins they contribute ultimately to the formation of bodies like glycerin; i. e., bodies which do no harm in the final product.

In the present process I first make a gas as rich as may be in unsaturated bodies and olefins. The heavier the gas the more propylene will be contained in it: and I ordinarily run the operation in a manner to obtain a gas as heavy as possible and as rich as possible in unsaturated bodies, that is, with a high bromin absorption. This gas may be purified if necessary. The necessity for such purification depends upon the character of the oil used. Ordinarily I run through the gasifying zone somewhat more oil than will be gasified therein and then quickly cool the issuing mixture of gas and vapors. This causes the excess of oil to condense out as a sort of fog and scrub the gas, so as to free it from volatile oils of the nature of gasoline. Their presence in the gas is not desirable but their production to a greater or less extent is inevitable in gasifying. The condensed oil carrying gasoline and the like may be returned for repassage through the gas-making zone.

The gas is next exposed to the action of a halogen, such as chlorin or bromin, this halogen being added in limited amounts and best as successive small portions. Much more care is needed at this stage in using bromin than in using chlorin. The amount of chlorin so added should not be greater than equivalent to the amount of non-ethylene unsaturated bodies present; i. e., the amount equivalent to the amount of gases absorbed by ordinary 1.84 specific gravity sulfuric acid. Acid of this strength as stated takes up very little ethylene, so absorption by it is a rough measure of the amount of unsaturated bodies other than ethylene present. The addition of chlorin to the gas may be in the cold and in the absence of much water or water vapor. Under these conditions the propylene will be mainly converted into propylene dichlorid with very little if any propylene chlorhydrin. The ethylene, if the operation is properly conducted, will not be affected to any extent. If it is affected, to the extent that it combines with chlorin there is, for the present purposes, a waste of chlorin. The propylene chlorid formed is relatively high boiling and can be condensed out of the mixture of gas and vapors.

If the oil gas be mixed with steam, the mixture being at a temperature of about 90° to 100° C., and chlorin added (best portionwise again) the main product of reaction will be propylene chlorhydrin which will remain with the vapors. On cooling the vapors the propylene chlorhydrins condense in water solution. Any propylene dichlorid that may be formed condenses also but does not dissolve. The ratio between the chlorhydrin and dichlorid produced depends on the conditions of work. The water solution containing propylene chlorhydrin may be redistilled to regain the latter. On distilation chlorhydrin goes over first and forms an oily layer of propylene chlorhydrin containing water separating from one of water containing chlorhydrin. From the latter the chlorhydrin may be recovered by repeating the operation in well known ways. From the wet propylene chlorhydrin the water in solution may be removed with dry salt.

The waste gas after the action of chlorin will contain the saturated hydrocarbons of the original gas, and the ethylene, most of the propylene (and impurities) having been removed. This waste gas may be used for fuel or other purposes. A portion of it may be returned to the gas making zone together with oil, where its presence tends to favor the production of propylene. The waste gas contains more or less propane but it is not deemed desirable in the present invention to attempt to utilize this propane. By reheating the waste gas the propane may be partly broken down to propylene, which is useful for the present process.

The next step to be taken differs somewhat according to the character of the product so far obtained; i. e., whether it is mostly propylene dichlorid or mostly propylene chlorhydrins. Both can be chlorinated to add chlorin on the carbon atom free of chlorin. If the mixture is mainly or exclusively propylene dichlorid it may be directly chlorinated in any of the known ways. A good way is to dissolve in it the right amount of chlorin for the present purposes, together with a little iodin to act as a catalyst, and then expose the solution to light. Or its vapor may be mixed with the right amount of chlorin and passed through a catalyzing material. The mixture may be passed through bone-black or the like.

If the product of the first operation is largely chlorhydrin it is better to chlorinate in a somewhat different manner in order to shield the OH group of chlorhydrin. In the chlorinating operation there is danger that this OH, which is what is known as an alcoholic hydroxyl, will undergo an oxidizing change to make an aldehyde; a change which is not desirable in the present invention. For this reason it is better to chlorinate in the presence of glacial acetic acid, or a saturated solution of sodium phosphate and phosphoric acid, or something else which will combine with the .OH group to form an ester, thus helping to shield the OH from the action of chlorin. A mixture rich in chlorhydrin may, for instance, be mixed with a strong solution of monosodium phosphate $NaH_2PO_4$ and chlorin led into the mixture, best in the presence of a little iodin.

In chlorinating propylene dichlorid, the product is symmetrical or 1-2-3 trichlorpropane, sometimes called trichlorhydrin to indicate its derivation from or relation to glycerin. This trichlorpropane boils at about 158° C. and it may be separated from the products of chlorination in a state of sufficient purity by ordinary fractionating treatment. This trichlorpropane may be converted into glycerin by heating under pressure with water or with sodium bicarbonate; the latter being preferred. Or it may be treated with sodium acetate solution to produce acetins and the latter then broken up with caustic soda, with sodium carbonate or with sodium bicarbonate to regain sodium acetate and to produce glycerin. Other products such as epidichlorhydrin may be produced by suitable methods of treatment.

In chlorinating chlorhydrin, the product is also a triderivative, dichlorhydroxypropane. This, like the trichlorpropane is a trisubstituted compound.

The described method of treatment may be used for making the bromids, using bromin instead of chlorin. But the addition of bromin must be much more gradual than that of chlorin in the stage where the oil gas is treated, to prevent formation of ethylene compounds. In using bromin, a convenient method of operation is to electrolyze sodium bromid (recovered from the glycerin making operation) in a heated cell and lead the mixture of bromin vapor and steam into the oil gas. Or the oil gas may be blown through or over the boiling electrolyte in the cell.

Use of a mixture of chlorin and water vapor from a hot cell electrolyzing chlorids is also convenient in working with the chlorin compounds.

What I claim is:

1. The process of making synthetic glycerin from petroleum oil, which comprises gasifying such oil under conditions producing an oil gas rich in propylene, treating such gas with an amount of chlorin sufficient to react with the propylene but not with the ethylene present, recovering the products of reaction, chlorinating to add an additional chlorin atom and converting the product so produced into glycerin.

2. The process of making synthetic glycerin from petroleum oil, which comprises gasifying such oil under conditions producing an oil gas rich in propylene, acting on the gas with chlorin to convert the propylene into a chlorin compound without material chlorination of the ethylene present, recovering the chlorin compound formed from the propylene, then chlorinating it further to form a new chlorinated product and converting this into glycerin.

3. The process of making synthetic glycerin from petroleum oil, which comprises gasifying such oil under conditions producing an oil gas rich in propylene, acting on the gas with a halogen in the presence of water to form halogen containing addition products of propylene, then halogenating said addition products further to form trisubstituted propane compounds, and converting the latter into glycerin.

4. The process of making synthetic glycerin from petroleum oil, which comprises gasifying such oil under conditions producing an oil gas rich in propylene, acting on the gas with a halogen in the presence of water to form dihalides and halohydrins of the propylene contained in the gas, recovering the products of reaction, subjecting these products to a further halogenating step in the presence of an esterifying reagent, recovering the trisubstitution compounds thus obtained, and finally subjecting these compounds to a saponifying step whereby they are converted into glycerin.

In testimony whereof, I affix my signature.

K. P. McELROY.